United States Patent
Waldhör et al.

(10) Patent No.: US 11,407,053 B2
(45) Date of Patent: Aug. 9, 2022

(54) WELDING DEVICE HAVING TWO WELDING TORCHES AND CONTROL UNIT FOR STARTING THE ARC IGNITION PROCESS, AND WELDING METHOD FOR WELDING WITH TWO WELDING PROCESSES UNDER AN ADAPTED STARTING PROCESS

(71) Applicant: FRONIUS INTERNATIONAL GMBH, Pettenbach (AT)

(72) Inventors: Andreas Waldhör, Pettenbach (AT); Dominik Söllinger, Krenglbach (AT); Rene Allerstorfer, Eferding (AT)

(73) Assignee: FRONIUS INTERNATIONAL GMBH, Pettenbach (AT)

(*) Notice: Subject to any disclaimer, the term of this patent is extended or adjusted under 35 U.S.C. 154(b) by 1024 days.

(21) Appl. No.: 14/388,515

(22) PCT Filed: Mar. 25, 2013

(86) PCT No.: PCT/EP2013/056241
§ 371 (c)(1),
(2) Date: Sep. 26, 2014

(87) PCT Pub. No.: WO2013/144076
PCT Pub. Date: Oct. 3, 2013

(65) Prior Publication Data
US 2015/0083699 A1    Mar. 26, 2015

(30) Foreign Application Priority Data

Mar. 29, 2012 (AT) .................................. A 385/2012

(51) Int. Cl.
*B23K 9/067* (2006.01)
*B23K 9/173* (2006.01)

(52) U.S. Cl.
CPC .......... *B23K 9/0671* (2013.01); *B23K 9/1735* (2013.01)

(58) Field of Classification Search
CPC .... B23K 9/0671; B23K 9/173; B23K 9/1735; B23K 9/06; B23K 9/067; B23K 9/12; B23K 9/121; B23K 9/125
(Continued)

(56) References Cited

U.S. PATENT DOCUMENTS 2,017,509 A * 10/1935 Osborne ................ B23K 9/121
    314/2
6,444,946 B1 * 9/2002 Korte .................. B29C 65/1435
    219/121.6
(Continued)

FOREIGN PATENT DOCUMENTS

CN    102 248 253 A    11/2011
DE    297 80 371 U1    2/1999
(Continued)

*Primary Examiner* — Justin C Dodson
(74) *Attorney, Agent, or Firm* — McGlew and Tuttle, P.C.

(57) ABSTRACT

A welding device has a central unit and a welding torch unit, which can be connected to the central unit. The central unit includes at least one welding current source for providing electric current needed to operate the welding torch unit and includes a control unit. The welding torch unit includes at least a first welding torch with a first welding wire and a second welding torch with a second welding wire. The control unit is configured to carry out a starting process in such a way that firstly a first arc ignition takes place at one of the two welding torches and after a waiting time since the first arc ignition has passed, a second arc ignition takes place at the other of the two welding torches, which until then was not ignited.

11 Claims, 4 Drawing Sheets

(58) Field of Classification Search
USPC ..... 219/130.1, 130.21, 130.33, 130.4, 130.5,
219/136, 137 R, 137.2, 137, 137.71, 139,
219/121.11, 121.6, 121.64, 56, 56.1
See application file for complete search history.

(56) References Cited

U.S. PATENT DOCUMENTS

2007/0145028 A1* 6/2007 Artelsmair ........... B23K 9/1675
219/137.71
2009/0294428 A1* 12/2009 Yoshima ................ B23K 9/067
219/137 R

FOREIGN PATENT DOCUMENTS

| | | |
|---|---|---|
| JP | 2002 224833 A | 8/2002 |
| JP | 2008 126 232 A | 6/2008 |
| JP | 2009 106 984 A | 5/2009 |
| JP | 2009 226 443 A | 10/2009 |
| WO | 2005/056 228 A1 | 6/2005 |

* cited by examiner

WELDING DEVICE HAVING TWO WELDING TORCHES AND CONTROL UNIT FOR STARTING THE ARC IGNITION PROCESS, AND WELDING METHOD FOR WELDING WITH TWO WELDING PROCESSES UNDER AN ADAPTED STARTING PROCESS

CROSS REFERENCE TO RELATED APPLICATIONS

This application is a United States National Phase application of International Application PCT/EP2013/056241 filed Mar. 25, 2013 and claims the benefit of priority under 35 U.S.C. § 119 of Austrian Patent Application A385/2012 filed Mar. 29, 2012, the entire contents of which are incorporated herein by reference.

FIELD OF THE INVENTION

The invention relates to a welding device with a central unit and a welding torch unit, which can be connected to the central unit, wherein the central unit comprises at least one welding current source for providing electric current needed to operate the welding torch unit and comprises a control unit, the welding torch unit comprises at least a first welding torch with a first welding wire and a second welding torch with a second welding wire, and the first welding torch is configured to carry out a first welding process and the second welding torch is configured to carry out a second welding process, the two welding torches being operable independently of one another. Furthermore, the invention relates to a welding method with at least a first welding process and a second welding process that are combined with one another.

BACKGROUND OF THE INVENTION

A welding device of this type and a welding method of this type are described, for example, in WO 2005/056 228 A1. One of the two welding processes may be configured here as a pulse welding process, as a spray arc welding process or as a cold metal transfer (CMT) welding process with a forward and backward movement of a welding wire, whereas the second welding process is in any case configured as a cold metal transfer welding process. The two welding processes are synchronized with one another in terms of time. The latter, however, only applies to the actual welding operation. The starting process and, in particular, the ignition of the arcs of the two welding processes, on the other hand, take place randomly. As a result, a sometimes increased material application is produced during the starting process, which is undefined and not desired.

SUMMARY OF THE INVENTION

The object of the invention relating to the welding device therefore consists in disclosing a welding device of the type described at the outset with an improved starting process.

To achieve this object, a welding device with a central unit and a welding torch unit, which can be connected to the central unit, is disclosed, wherein the central unit comprises at least one welding current source for providing electric current needed to operate the welding torch unit and comprises a control unit, the welding torch unit comprises at least a first welding torch with a first welding wire and a second welding torch with a second welding wire, and the first welding torch is configured to carry out a first welding process and the second welding torch is configured to carry out a second welding process, the two welding torches being operable independently of one another, the control unit is configured to carry out a starting process in such a way that firstly a first arc ignition takes place at one of the two welding torches and after a waiting time since the first arc ignition has passed, a second arc ignition takes place at the other of the two welding torches, which until then was not ignited, wherein the control unit is configured, at one of the points in time comprising a point in time before and a point in time during the first arc ignition taking place at the one of the two welding torches, to bring about a forward movement of the welding wire of the other of the two welding torches before the arc ignition thereof in the direction of a workpiece to be welded, to detect a short circuit of this welding wire with the workpiece, and then to transfer the welding wire end of the welding wire of the other of the two welding torches into a waiting position, the welding wire end of the other of the two welding torches being in the waiting position until the end of the waiting time.

The welding device may, in particular, be configured for precisely two welding processes with two welding torches. Likewise, it is also possible for the welding device to contain more than two welding processes with, correspondingly, more than two welding torches. In the welding device according to the invention, a defined ignition is provided in a targeted manner at the at least two welding torches involved. In other words, it is no longer left to chance, which of the welding torches is ignited first and at what time interval after this first ignition the ignition of the other welding torch(es) takes place. In the advantageous starting process of the welding device it is ensured that an arc ignition firstly takes place at an, in particular, predeterminable welding torch, whereas the welding wire end of the other welding torch(es) is located in the, in particular, defined waiting position until the end of the waiting time. The firstly unignited welding torch(es) is/are advantageously also brought into a defined state very quickly at the beginning of the starting process in order to rapidly and, in particular, then without the interposition of further preparatory steps, to also be ignited when the waiting time has passed.

Because of this favorable starting process of the welding device, it can be established very precisely how much material is applied at the beginning of the welding processes. It can also be established how much weld penetration and how much introduction of heat is produced at the beginning. As a result, the quality of the welding result as a whole is also improved.

A configuration is favorable, in which at least one of the two welding processes is configured as a pulse welding process, a spray arc welding process, a short arc welding process or a cold metal transfer welding process or contains at least one part process configured as a pulse welding process, spray arc welding process, short arc welding process or cold metal transfer welding process. It is thus, in particular, possible for the welding process to be carried out after the ignition during an initial process phase, for example as a cold metal transfer welding process in order to be changed over after a certain process period to another welding process type, for example to a pulse welding process. The welding device can thus be used very flexibly. It provides a large number of various operating modes, the favorable starting process in each case being provided with the defined ignition of the welding processes involved.

According to a further favorable configuration, the control unit is configured to bring about, before the arc ignition, a forward movement of at least one of the two welding wires in the direction of a workpiece to be welded and to detect a short circuit of this welding wire with the workpiece, and thereafter to bring about, in particular, a backward movement of this welding wire until a waiting position is reached. As a result, in particular at the beginning of the welding process, the position of the welding wire ends in relation to the workpiece to be welded can be established precisely, so a defined arc ignition can take place under the respectively desired conditions. In the case of the initially unignited welding torch, the forward and backward movement of the welding wire with the short circuit located in between with the workpiece to be welded is also favorable, as the welding wire end of the associated second welding torch can thus be favorably brought into the preferably defined waiting position, from which the ignition of the second welding process and therefore the second welding process can be started per se in a rapid and defined manner.

A further configuration is favorable, in which the control unit is configured to bring about, before the arc ignition, a forward movement at least of one of the two welding wires until a workpiece to be welded is contacted and thereafter to bring about a backward movement of this welding wire until a welding wire end of this welding wire reaches a rigidly predetermined or adjustable distance from the workpiece. This distance can then advantageously be the waiting position, into which the associated welding torch is transferred until the arc ignition. This distance between the welding wire end and the workpiece to be welded is thus preferably either rigidly predetermined or can be adjusted in this configuration of the welding device. Both are favorable and lead to a defined starting process and to good welding results.

According to a further favorable configuration, the waiting time is rigidly predetermined or adjustable from the first to the second arc ignition. The flexibility and the use possibilities of the welding device also increase as a result.

According to a favorable alternative configuration, the control unit can also be configured to bring about a coupling between the two welding processes such that the waiting time from the first to the second arc ignition is determined by a process progress of the welding process that began after the first arc ignition or at least of an initial process of the welding process that began after the first arc ignition, the process progress being used as a measure for the waiting time being rigidly predetermined or adjustable. The latter again leads to a high degree flexibility and diverse possibilities of use for the welding device. The initial coupling provided in this configuration between the welding processes allows the second welding process, which has not yet been ignited, to only start when the first already running welding process has reached a specific status. As a result, an additional measure of process security is achieved for the sequence of the starting process.

According to a further favorable configuration, a control signal indicates the reaching of the decisive process progress of the welding process that began after the first arc ignition or its initial process. This control signal can then be directly used to start the second welding process or second welding torch located in the waiting position, in particular to ignite it. As a result, a particularly simple and efficient initial coupling is produced between the two welding processes.

According to a further favorable configuration, the waiting time from the first to the second arc ignition is at most three seconds. This maximum timespan for the waiting time has proven to be very advantageous. The maximum value mentioned is, in particular, long enough to approach the firstly ignited first welding process in a defined manner. On the other hand, it is also, in particular, short enough to carry out too long a welding with only one of actually two or even more provided welding processes.

A further configuration is favorable, in which an adjustability is provided regarding at which of the two welding torches the first arc ignition is to take place. This also increases the flexibility of use of the welding device. In particular, the welding device can then also be operated with opposing welding directions, without a modification being necessary.

The further object of the invention relating to the welding process is to disclose a welding process of the type mentioned at the outset with an improved starting process.

To achieve this object, a welding method with at least a first welding process and a second welding process, which are combined with one another, is disclosed, a starting process of the two welding processes being carried out in such a way that a first arc is firstly ignited in the course of the one of the two welding processes, and after the ignition of the first arc, a waiting time passes before a second arc is ignited in the course of the other of the two welding processes, wherein before or during the ignition of the first arc, a welding wire involved in the other of the two welding processes is moved forward in the direction of a workpiece to be welded before the arc ignition thereof, a short circuit of this welding wire with the workpiece is detected, and the welding wire end of the welding wire involved in the other of the two welding processes is transferred with into a waiting position, the welding wire end of the other of the two welding torches being in the waiting position until the end of the waiting time.

The welding method according to the invention and its configurations has substantially the same particular properties and advantages, which have already been described in conjunction with the welding device according to the invention and its configurations.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Mutually corresponding parts are provided with the same reference numerals in FIGS. 1 to 5. Details of the embodiments described in more detail below may, per se, represent an invention or be part of an inventive subject.

Figure 1:
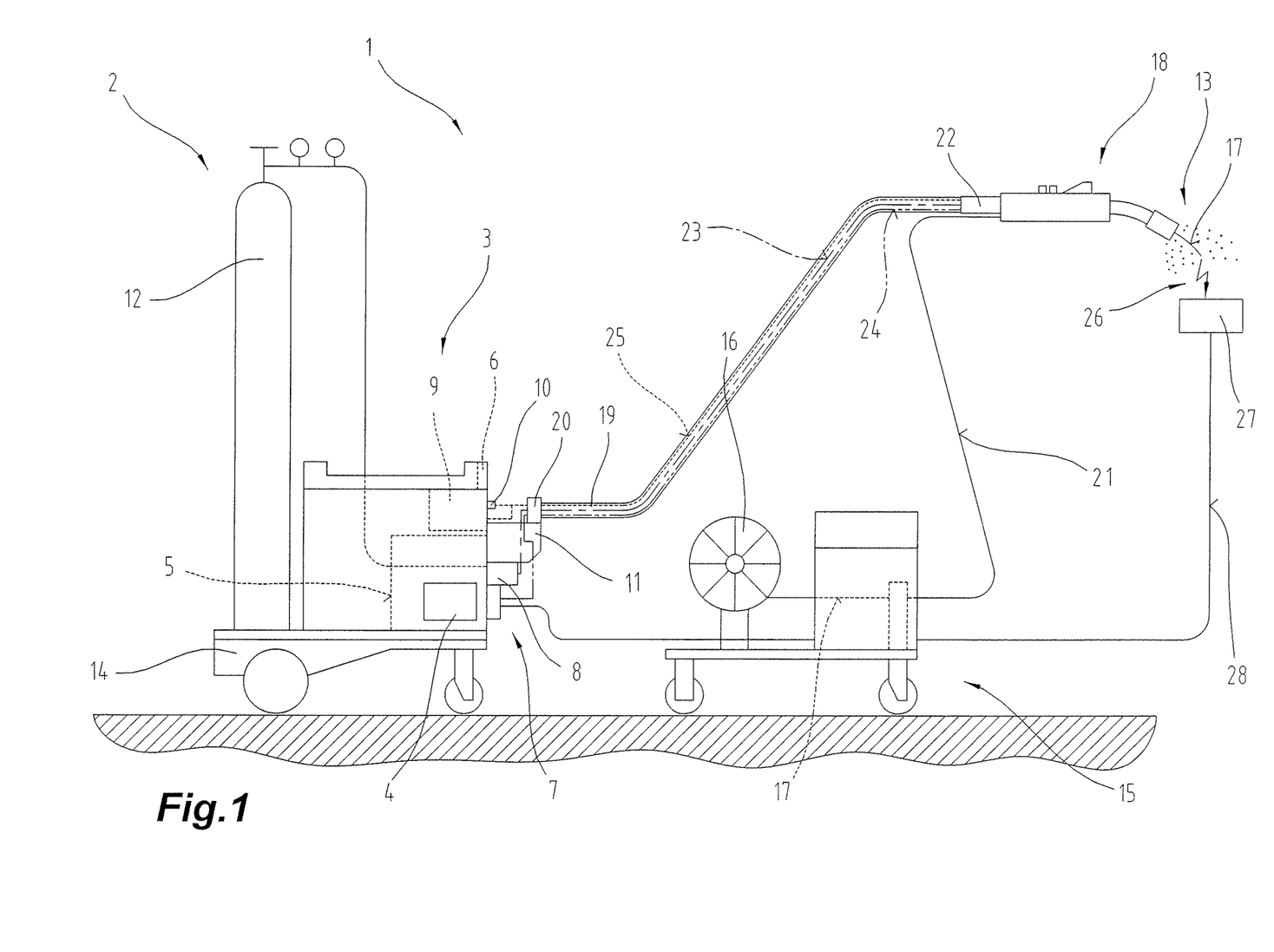
FIG. 1 is a schematic view of an embodiment of a welding device.

An embodiment of a welding device 1 is shown in FIG. 1. The welding device 1 is a welding apparatus or a welding facility, which is designed for various welding processes or methods, such as, for example, MIG/MAG welding, WIG/TIG welding, electrode welding or double wire tandem welding. Furthermore, a configuration for plasma or soldering methods can also be provided.

The welding device 1 comprises a central unit 2, which is sometimes also called the actual welding apparatus. The central unit 2 comprises a current source 3 with a power part 4, a control unit 5 and an input/output unit 6. Moreover, further components may be provided in the central unit 2, such as, for example, a changeover element 7 associated with the control unit 5, a control valve 8 connected to the changeover element 7, a water container 9 and a flow monitor 10. These components of the central unit 2 are arranged in a common housing 11 in the embodiment shown in FIG. 1. Furthermore, the central unit 2 comprises a gas store 12 for a gas 13, in particular a protective gas, such as, for example, $CO_2$, helium or the like. The housing 11 and the gas store 12 are placed in a rollable lower part 14 and form a first part unit of the central unit 2.

A second part unit of the central unit 2 is formed by an also rollable wire feed unit 15, which is also activated by the control unit 5 of the first part unit. The wire feed unit 15 contains a supply drum 16, on which a welding wire 17 is wound.

Basically, the wire feed unit 15 may also be a component of the first part unit and also be located within the housing 11. In the embodiment shown in FIG. 1, the wire feed unit is configured as a separate additional apparatus. However, this is not absolutely necessary.

Moreover, the welding device 1 comprises a welding torch unit 18, which is connected by a hose package 19 and a tension relief device 20 to the housing 11 as well as by means of a supply line 21 to the wire feed unit 15.

The welding wire 17 stored in the supply drum 16 is fed to the welding torch unit 18 by means of the supply line 21, as conventional, in particular in MIG/MAG welding. Basically, it is, however, also possible for the wire feed unit 15 to bring the welding wire 17 or another additional material outside the welding torch unit 18 to the process point, i.e. to the point, at which the actual welding process takes place. In this alternative configuration not shown in the figures, a non-melting electrode is preferably arranged in the welding torch unit 18, as is conventional, for example, in WIG/TIG welding.

The hose package 19, which is connected to the welding torch unit 18 by means of a coupling 22, contains an electric welding line 23, a gas supply line 24 as well as a cooling circuit 25. The gas 13 is transported from the gas store 12 to the welding torch unit 18 by means of the gas supply line 24. Likewise, the electric welding line 23 is used to transport the current produced in the current source 3 to the welding torch unit 18.

The electric current fed to the welding torch unit 18 by way of the welding line 23 is used to construct an arc 26, in particular a working arc, between an electrode of the welding torch unit 18 and a workpiece 27 to be welded, which is formed from a plurality of parts to be connected. The workpiece 27 can be connected by a further electric welding line 28 to the current source 3 of the welding device 1. The two welding lines 23 and 28, together with the arc 26 and the current source 3, form a closed current circuit.

The welding torch unit 18 may have a cooling device. For this purpose, cooling liquid, in particular water, is fed from the water container 9 to the welding torch unit 18 by means of the cooling circuit 25. The cooling circuit 25 is monitored here by the flow monitor 19. A liquid pump, not shown in more detail, is started when the welding torch unit 18 is started up, so the cooling circuit 25 is set in motion between the water container 9 and the welding torch unit 18. In principle, it is also possible for the welding torch unit 18 to not be equipped with a liquid cooling device, but with an air cooling device.

A large number of welding parameters, operating types and/or welding programs can be adjusted or called up by means of the input/output unit 6 at the central unit 2. The welding parameters, operating types and/or welding programs adjusted by means of the input/output unit 6 are forwarded to the control unit 5, which then activates the individual components of the welding device 1 according to these specifications and/or predetermines corresponding desired values to regulate or control these individual components, so the desired welding process is adjusted.

In the embodiment of the welding device 1 shown in FIG. 1, a large number of various individual components are provided. Basically, there are alternative configurations, which are not shown and in which the welding device does not comprise all these individual components. This is, for example, the case in special WIG apparatuses, MIG/MAG apparatuses or plasma apparatuses.

The welding torch unit 18 has at least two welding torches, not shown precisely in the schematic view according to FIG. 1, which can be operated independently of one another and by means of which two welding processes can be carried out. Basically, the welding torch unit 18 may also comprise more than two separate welding torches in alternative embodiments.

Figure 2:
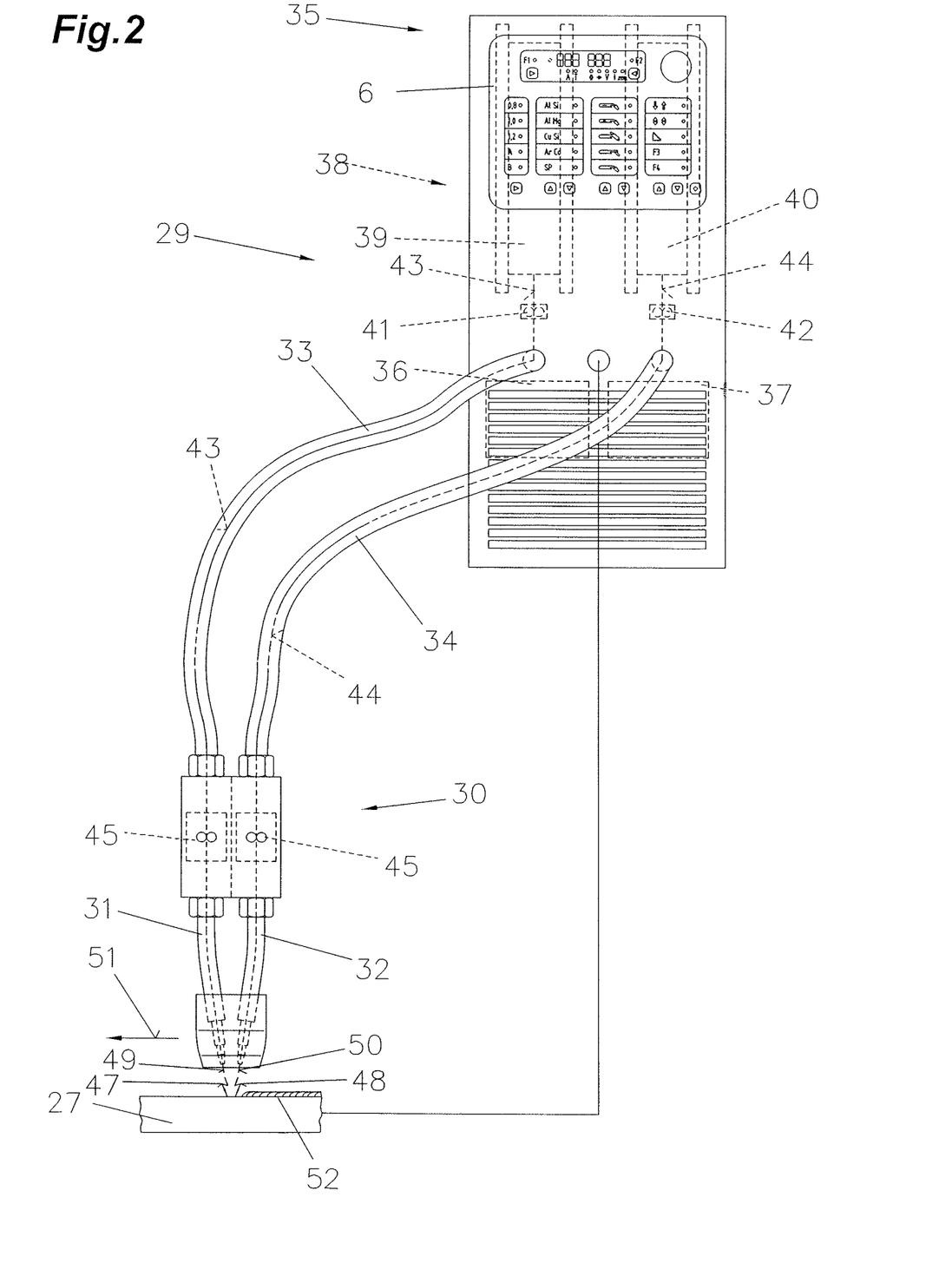
FIG. 2 is a schematic view of an embodiment of a welding device with two welding torches.

A further embodiment of a welding device 29 is shown in FIG. 2, which contains a welding torch unit 30 with two separate welding torches 31 and 32 that can be operated independently of one another. Each of the two welding torches 31 and 32 is connected by its own hose package 33 or 34 to a central unit 35, which can also in turn be designated the actual welding apparatus. By means of these two hose packages 33 and 34, the welding torches 31 and 32 are supplied independently of one another with all the components needed to carry out a welding process, such as, for example, the gas 13, the electric current and the cooling liquid. To this extent, reference is made to the corresponding configurations in conjunction with the embodiment of the welding device 1 shown in FIG. 1.

The central unit 35 of the welding device 29, apart from the not expressly shown control unit 5, comprises two separate current sources 36 and 37 as well as a wire conveying unit 38 with two separate supply drums 39 and 40 and two drive units 41 and 42, by means of which welding wires 43 and 44 are conveyed from the two supply drums 39 and 40 and fed to the welding torches 31 and 32 by means of the hose packages 33 and 34. Optionally, an additional drive unit 45 may be provided in the welding torch unit 30 for the two welding torches 31 and 32, in each case, which drive unit is in each case entered by way of an example and with a dashed line in the embodiment shown in FIG. 2. The welding torch unit 30, in the embodiment shown, has a common gas nozzle 46 for the two welding torches 31 and 32.

With regard to the mode of functioning of the individual assemblies and components of the welding device 29, reference is made to the corresponding statements in conjunction with the welding device 1 shown in FIG. 1. In particular, the central unit 35 of the welding device 29 also comprises an input/output unit 6, by means of which, exactly as in the welding device 1, welding parameters, operating types and/or welding programs can be adjusted.

The mode of functioning of the welding device 29 will be described below.

The first welding torch 31 is configured to carry out a first welding process and the second welding torch 32 is configured to carry out a second welding process. The embodiment shown in FIG. 2 in the case of the two welding torches 31 and 32 is preferably a MIG/MAG torch in each case, by means of which a pulse welding process but also a cold metal transfer welding process can be carried out in each case. Other modes of operation are also basically possible.

In the case of the two welding torches 31, 32, at the beginning of the welding processes, an arc 47 or 48 is ignited between the welding wire end 49 or 50 of the relevant welding wire 43 or 44, on the one hand, and the workpiece 27, on the other hand.

The first welding torch 31 is arranged upstream of the second welding torch 32, viewed in a welding direction 51. The welding direction 51 is oriented here approximately parallel to a longitudinal direction of a weld seam 52, by means of which the individual parts of the workpiece 27 are connected. Basically, however, a reversed arrangement order of the welding torches 31, 32 is also possible, for example during an operation with an opposing welding direction. In this opposing welding direction, the welding torch 32 would then be arranged upstream of the welding torch 31, viewed in the welding direction. Moreover, the two welding torches 31 and 32 may be arranged at the same height in relation to the welding direction 51, but spaced apart from one another perpendicular to the welding direction 51.

The coordinated starting process of the two welding torches 31 and 32 will be described below with the aid of the flowchart according to FIG. 3 and the movement diagrams according to FIGS. 4 and 5.

Figure 3:
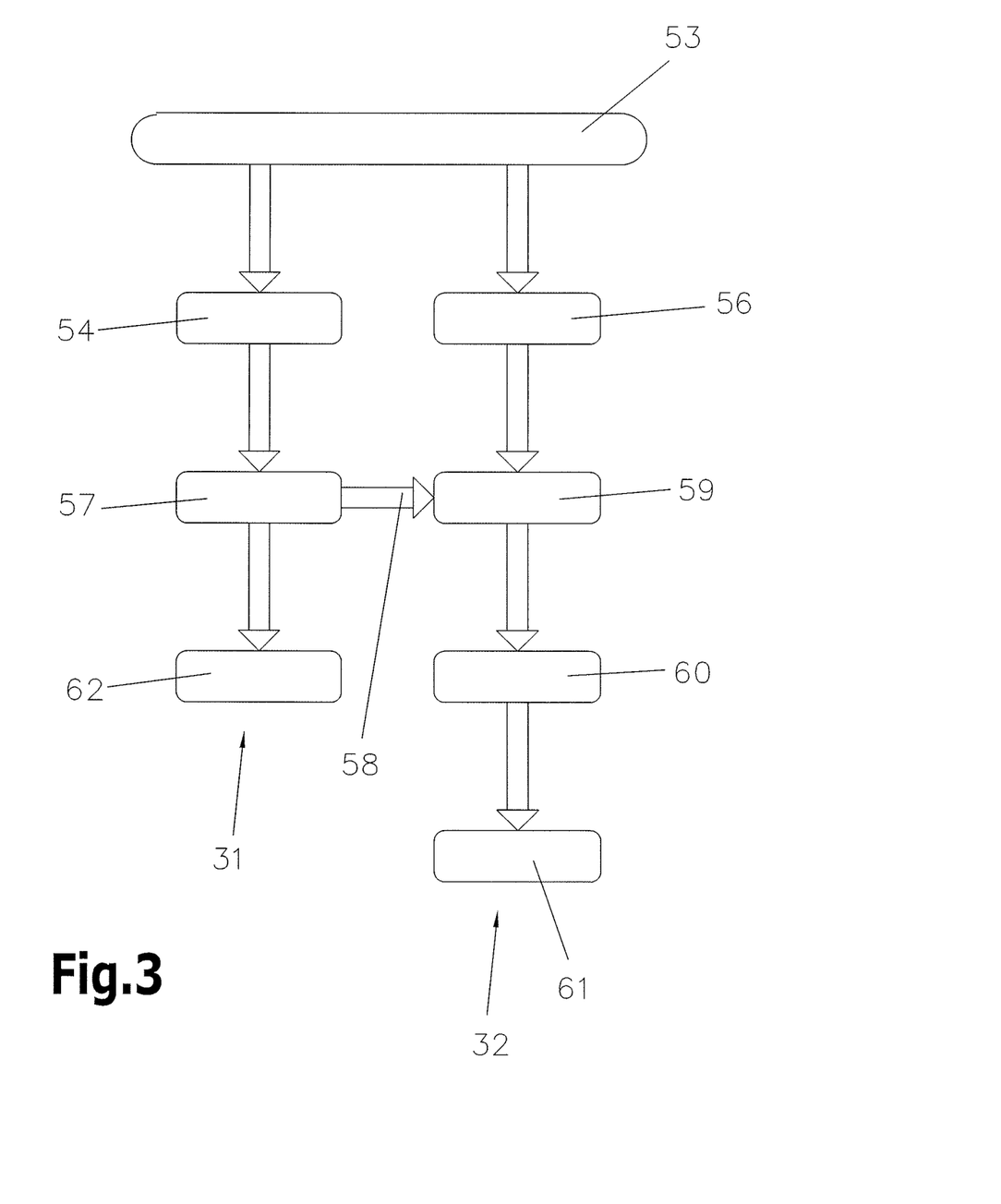
FIG. 3 is a flowchart of the starting process of the two welding torches of the welding device according to FIG. 2.

A flowchart depicting the starting process of the two welding torches 31 and 32 is shown in FIG. 3. It is established during a first decision step 53 which of the two welding torches 31 and 32 is to have the master function and which of the two welding torches 31 and 32 is to have the slave function. As already mentioned, this allocation can be predetermined and may also change depending on the type of operation selected. It is assumed here by way of example that the welding torch 31 has the master function and the welding torch 32 has the slave function. The left-hand part of the flowchart of FIG. 3 relates to the master welding torch 31 and the right-hand part relates to the slave welding torch 32.

Figure 4:
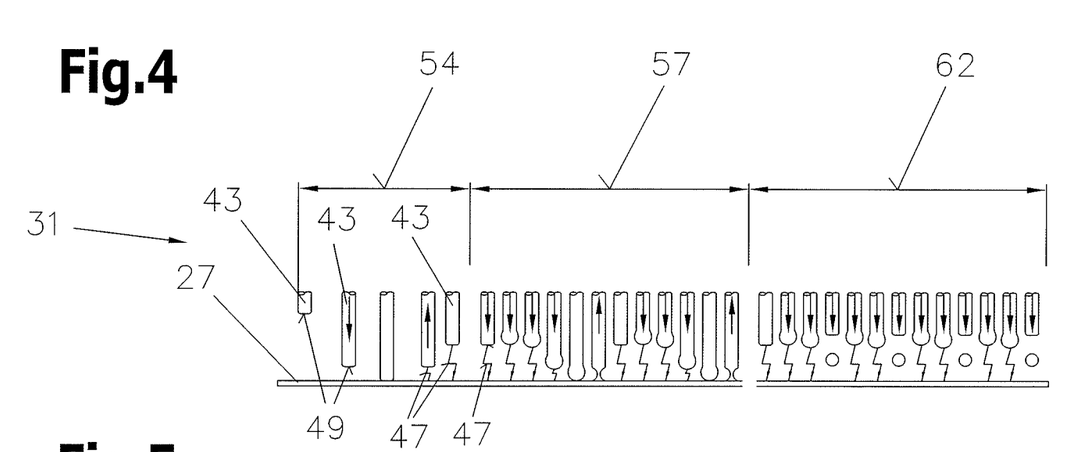
FIG. 4 is a movement diagram of a welding wire of one of the two welding torches of the welding device according to FIG. 2 during the starting process.
Figure 5:
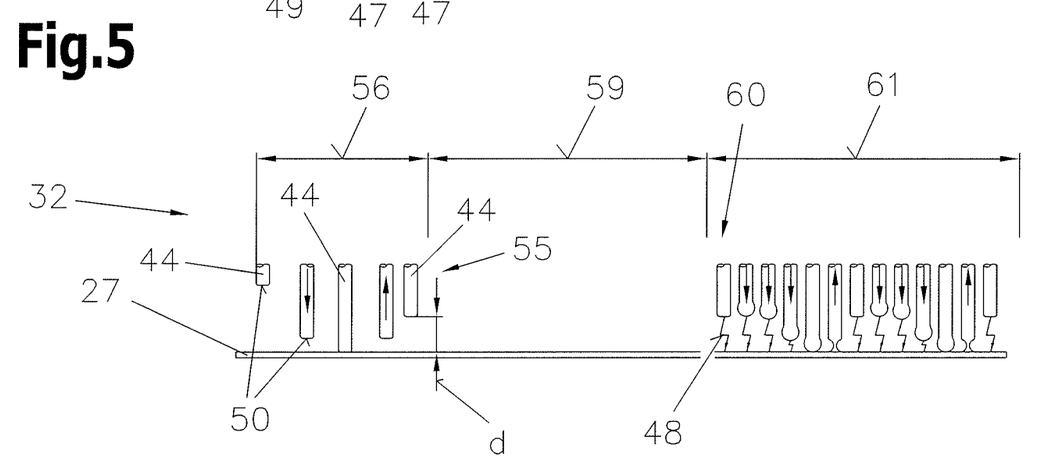
FIG. 5 is a movement diagram of a welding wire of the other of the two welding torches of the welding device according to FIG. 2 during the starting process.

Once the allocation of the master and slave function has been established in step 53, the welding wire 43, 44 is moved forward in the two welding torches 31 and 32 until the welding wire end 49, 50 contacts the workpiece 27 (see FIGS. 4 and 5). This contact is identified by a short circuit detection. Thereupon, the ignition of the arc 47 immediately takes place in the case of the master welding torch 31. From this instant, the arc 47 burns at the welding torch 31 in particular uninterruptably for the entire duration of the welding process carried out with the welding torch 31. The forward movement, short circuit identification and arc ignition during backward movement of the welding wire 43 is combined for the master welding torch 31 in the ignition step 54 (see FIGS. 3 and 4).

On the other hand, no arc ignition takes place yet in the case of the slave welding torch 32 after the short circuit detection. Rather, the welding wire 44 is moved back into a waiting position 55 (see FIG. 5). This is symbolized in the flowchart according to FIG. 3 by the short circuit and withdrawal step 56 (see FIGS. 3 and 5). In the waiting position 55, the welding wire end 50 of the welding wire 44 is located at a defined and, in particular adjustable, spacing d from the workpiece 27 (see FIG. 5).

An initial welding process 57, which is, for example, configured as a cold metal transfer welding process with a welding wire 43 moved forward and backward, is now carried out in the case of the master welding torch 31 (see FIGS. 3 and 4). Basically, the initial welding process 57 may also be configured differently, for example as a pulse welding process.

As soon as the control unit 5 identifies a predefined or adjusted process progress or as soon as a predefined or adjusted starting time has passed, the initial welding process 57 is completed. The control unit 5 then produces a control signal 58 (see FIG. 3), which causes the slave welding torch 32 to end its waiting step 59 (see FIGS. 3 and 5) or its waiting time and to carry out an ignition step 60 (see FIGS. 3 and 5) with the ignition of the second arc 48 followed by an initial welding process 61 (see FIGS. 3 and 5) of the second welding torch 32. The initial welding process 61 of the second welding torch 32 is also a cold metal transfer welding process with a welding wire 44 moved forward and backward. The control signal 58 can, in particular, be configured as a digital signal here. It is preferably indicated by means of a bit especially provided for this that the waiting time or the waiting step 59 for the slave welding torch 32 has passed or ended.

In parallel with the ignition of the second arc 48 at the slave welding torch 32, the main welding process 62 (see FIGS. 3 and 4), which is configured, for example, as a pulse welding process, starts at the master welding torch 31.

The starting process of the two welding torches 31 and 32 is distinguished by a defined waiting time and an ignition of the two arcs 47 and 48 spaced apart in terms of time. Undefined process conditions can thus be avoided. Rather, it is clearly established at each instant, which state the two welding torches 31 and 32 are in. It can thus be very precisely established even during the starting process, how much material is applied to the workpiece 27 to form the weld seam 52 and how large the weld penetration and introduction of heat are. This favors very good welding results.

While specific embodiments of the invention have been shown and described in detail to illustrate the application of the principles of the invention, it will be understood that the invention may be embodied otherwise without departing from such principles.

The invention claimed is:

1. A welding method, comprising:
   providing at least a first welding process carried out by a first welding torch with a first welding wire and a second welding process carried out by a second welding torch with a second welding wire, wherein the first welding process and the second welding process are combined with one another to connect individual parts of a workpiece by a weld seam, the first welding torch of the first welding process and the second welding torch of the second welding process being operable independently of one another;
   carrying out a starting process of the first welding process and the second welding process in that a first arc is firstly ignited at a beginning of the first welding process, and after ignition of the first arc in the course of an ignition step of the first welding wire, a waiting time passes before a second arc is ignited at a beginning of the second welding process, wherein one of before and during the ignition of the first arc and in the course of a short circuit and withdrawal step of the second welding wire, the second welding wire involved in the second welding process is moved forward in a direction of the workpiece to be welded before the second arc is ignited, the second welding wire contacts the workpiece, a short circuit of the second welding wire with the workpiece is detected, and a welding wire end of the second welding wire involved in the second welding process is transferred into a waiting position after the second welding wire contacts the workpiece, wherein the short circuit and withdrawal step of the second welding wire occurs during the ignition step of the first welding wire, and an initial welding process of the first welding process is carried out and the welding wire end of the second welding wire is in the course of a waiting step in the waiting position until the waiting time is over, wherein the initial welding process of the first welding process and the waiting step of the second welding wire occur simultaneously.

2. A welding method according to claim 1, wherein at least one of the first welding process and the second welding process is formed by one of a pulse welding process, a spray arc welding process, a short arc welding process and a cold metal transfer welding process, wherein the second arc is not ignited until after the welding wire end of the second welding wire is moved to the waiting position.

3. A welding method according to claim 1, wherein before the first arc ignition, the first welding wire that is used during the first welding process is moved forward and a short circuit of the first welding wire with the workpiece to be welded is detected.

4. A welding method according to claim 1, wherein the second welding wire involved in the second welding process is firstly moved forward until the workpiece to be welded is contacted and is then moved backward until the welding wire end of the second welding wire reaches one of a determined distance and an adjustable distance from the workpiece.

5. A welding method according to claim 1, wherein the waiting time between the ignition of the first arc and the second arc is one of a determined waiting time and an adjusted waiting time.

6. A welding method according to claim 1, wherein a coupling is provided between the first welding process and the second welding process, so the waiting time between the ignition of the first arc and the second arc is determined by a process progress of the first welding process that began after the first arc ignition, the process progress being used as a measure for the waiting time being one of a determined and adjusted waiting time.

7. A welding method according to claim 6, wherein on reaching a decisive process progress of the first welding process that began after the first arc ignition, a control signal is produced, by means of which the ignition of the second arc is brought about.

8. A welding method according to claim 1, wherein a value of at most three seconds is provided for the waiting time between the ignition of the first arc and the second arc.

9. A welding method according to claim 1, wherein before the ignition of the first arc, establishing which of the first welding torch and the second welding torch has a master function and which of the first welding torch and the second welding torch has a slave function.

10. A welding method according to claim 1, wherein at least one of the first welding process and the second welding process contains at least one part process configured as one of a pulse welding process, spray arc welding process, short arc welding process and a cold metal transfer welding process.

11. A welding method according to claim 1, wherein the first welding torch and the second welding torch are supplied with electric current independently of one another, wherein the first arc is not used to generate the second arc and the second arc is not used to generate the first arc.

* * * * *